April 4, 1961   F. VEATCH ET AL   2,978,339
METHOD OF PRODUCING HOLLOW GLASS SPHERES
Filed Oct. 22, 1957   3 Sheets-Sheet 1

INVENTORS.
FRANKLIN VEATCH,
HARVEY E. ALFORD &
RICHARD D. CROFT
BY
ATTORNEY

April 4, 1961   F. VEATCH ET AL   2,978,339
METHOD OF PRODUCING HOLLOW GLASS SPHERES
Filed Oct. 22, 1957   3 Sheets-Sheet 2

INVENTORS
FRANKLIN VEATCH,
HARVEY E. ALFORD &
RICHARD D. CROFT
BY Leland L. Chapman
ATTORNEY

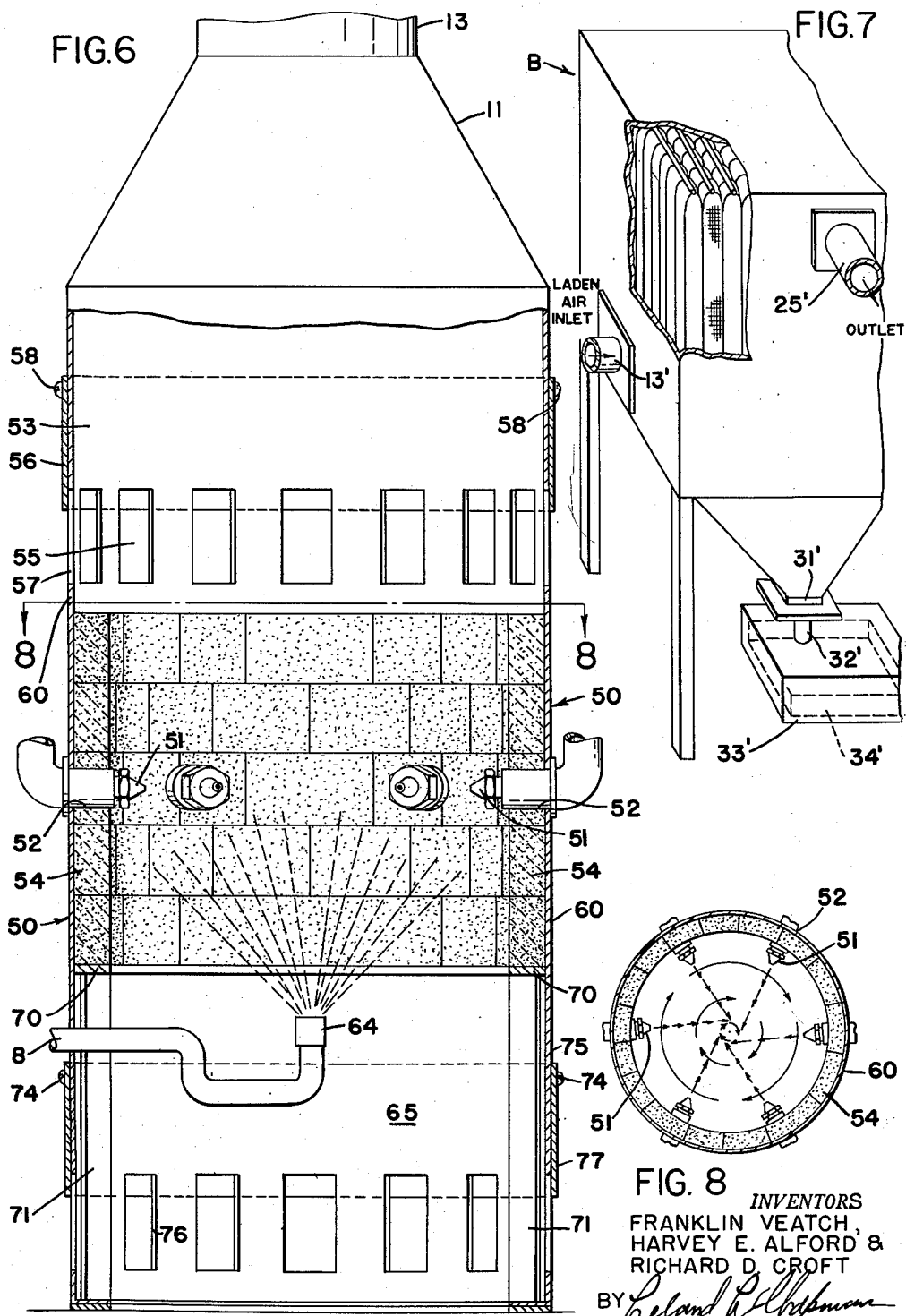

United States Patent Office 2,978,339
Patented Apr. 4, 1961

2,978,339

METHOD OF PRODUCING HOLLOW GLASS SPHERES

Franklin Veatch, Lyndhurst, Harvey E. Alford, Amherst, and Richard D. Croft, Wapakoneta, Ohio, assignors to The Standard Oil Company, Cleveland, Ohio, a corporation of Ohio Filed Oct. 22, 1957, Ser. No. 691,725

3 Claims. (Cl. 106—40)

This invention relates to an improved method for producing hollow particles from film-forming materials. A process for forming the same general type of hollow particles is disclosed in Patent No. 2,797,201. In that process a solution comprising a film-forming material and a latent gas material dissolved in a volatile solvent is subdivided into droplets at the top of a spray-drying chamber. The droplets then fall through the drying atmosphere, during which the solvent is evaporated and a hole-free, tough surface skin is formed on the particles simultaneously with the liberation of a gas from the latent gas material.

Patent No. 2,676,892 describes another process in which particles of naturally occurring clay are fed into the top of a furnace. They expand as they pass downwardly therethrough and are collected at the bottom of the furnace.

These previously known methods for producing hollow particles utilize furnaces or spray-drying equipment wherein the feed material, whether in the solid state or in the liquid state, is dispersed by some means in the upper region of the furnace or drying chamber and subsequently falls through the heating zone. Due to the forces of gravity, the residence time of a particle in the hot zone of the furnace using such a procedure varies inversely with its mass or the size of the particle, assuming the feed material is of fairly uniform density (Stokes' law). It is estimated that the relative heat for conversion to the hollow form approaches the cube of particle diameter, and hence significantly higher heat requirements are necessary as particle size increases. Therefore, care must be taken with these prior art methods to maintain the feed with a narrow particle size range in order to produce low density hollow spheres in high yield. If close control of the particle size range is not maintained, the larger particles will pass downward through the furnace too rapidly due to their greater mass and result in an underheated and poorly expanded product. The converse will be true of the smaller particles since due to their light weight they will require a longer time to pass downward through the furnace and result in overheated product.

It has been discovered that this overheating and underheating of the film-forming particles adversely affects product quality in that it increases bulk density of the product, thereby limiting the commercial utility of the product. It has been observed that overheated particles appear either as solid spheres or hollow spheres with a very thick wall with a consequent high density. The underheated particles appear as spongy masses which exhibit intercellular character. Obviously either of these forms in any appreciable percentage will adversely affect the bulk density of the product.

Hence, it is an object of this invention to provide a method for obtaining an improved conversion of film-forming feed particles to hollow spheres, thereby producing a product of a lower bulk density which is capable of greater commercial utility.

It is a further object of this invention to provide a method which compensates for variances in the particle size of any selected film-forming material, thereby permitting wider range in the size of the feed particles and effecting savings in classifying and reducing waste.

The principal distinction of the process of the invention over previous methods resides in the introduction of feed near the bottom of said furnace into an ascending column of hot furnace gases. The feed material is admitted in subdivided form and is entrained in an upward moving, hot, gaseous stream. Actual residence time of the particles within the furnace by this method becomes a function of the particles' mass balanced against the buoyancy supplied by the velocity of the upward flow of gases. Therefore, the large particles ascend through the hot zone of the furnace more slowly than small particles due to the force of gravity acting on the particles, as may be seen from the earlier discussion (i.e., Stokes' law). As a result, the particles are heated for a time period in the furnace in direct relationship to the heat requirements necessary to convert the particles of feed into hollow spheres.

Furthermore, this method takes advantage of the inherent property associated with product conversion, and it will be seen that this process will utilize this conversion of feed particles into hollow spheres to better approach the conditions of an ideal furnace. As has already been discussed, the ideal operating conditions for the furnace would retain the feed particles within the hot zone for a residence time just adequate to fuse a tough outer skin on the particle and convert substantially all the latent gas material into a gas so that coincident with the fusing of the outer shell of the particle the gas is available to fill the hollow space formed in the interior of the particle. It then becomes essential that the hollow sphere is removed from the hot zone of the furnace at the point of its maximum expansion and before it remains at the fusing temperature too long, which would cause rupture or collapse of the particle and formation of a fused bead or solid sphere. In this process, as the particle "puffs" or expands, its relative diameter increases significantly and the density of the particle decreases simultaneously. This favorably disturbs the former balance between settling rate and the upward velocity of furnace gas since the buoyant effect of the gas on the suspended particle increases with a decrease in density, resulting in the particle being carried upward in the furnace at a fast rate at this critical time and out of the hot zone of the furnace into regions of progressively diminishing temperatures where it can be retained in regions where the temperature is below the fusing temperature of the feed material so the outer skin of the particle can cool and solidify, providing the mechanical strength desired prior to product recovery.

Other important advantages and features of this process will become apparent from the following detailed description of the apparatus and possible modifications thereto.

The accompanying drawings illustrate various functional forms of our invention and in these drawings:

Figure 6 is an elevation, partly in section, of the modified apparatus shown in Figure 5;

Figure 7 is an isometric view, partly in section, of a bag filter system for separating the product particles from the gases; and Figure 8 is a horizontal section on line 8—8 in Figure 6 showing the entry of the torch burners through the furnace wall.

Figure 1:
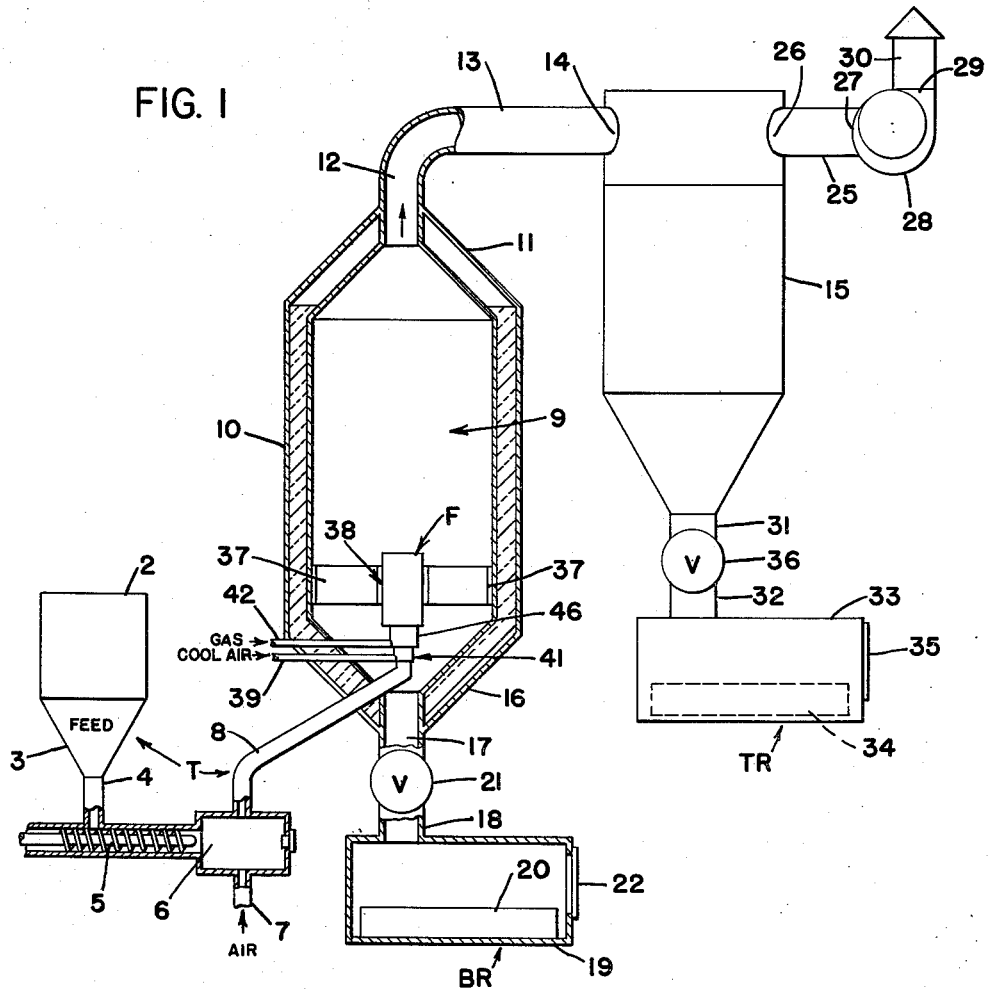
Figure 1 is an elevation, partly in section, of an apparatus suitable for carrying out the method of my invention.

Referring more particularly to Figure 1, the apparatus comprises a furnace unit F, the components of which will be described hereinafter in detail, capable of converting feed material into hollow spheres, an insulating jacket 10 formed of two layers of sheet metal with insulation between the layers which surrounds furnace unit F and aids in maintaining the temperature levels within said furnace, a transporting means T for the feed material to furnace F, and bottom product recovery means BR to collect product at the bottom of jacket 10, and means to take product and gases overhead from jacket 10 by cyclone separator 15 with top product recovery means TR.

Insulating jacket 10 is of cylindrical shape several times the height of the furnace F and several times the diameter of furnace F with an upper end portion 11 formed as a frustum of a cone converging to a central opening 12 of circular cross section of considerably less diameter than that of jacket 10. The jacket 10 has a lower end portion 16 formed as an inverted frustum of a cone similar in shape and dimension to upper end portion 11. The lower portion 16 converges to a central opening 17. Conduit 18 leads from this opening vertically downward to product recovery bin 19 where the product receiver 20 is situated. Between the conduits 17 and 18 is a gas-tight valve 21 which can close off conduit 18 so that product may be collected in the bottom of the lower portion 16 of the jacket 10 during the interval of time it takes to open product bin 19 and change product receivers. The bin 19 has a gas-tight door 22 on one side so that product will not be lost during normal product collection in the receivers.

It is important that the height and diameter of the jacket 10 is substantially greater than the respective dimensions of the furnace F to provide a quenching zone 9. In this zone the temperature of the converted feed particles can be cooled so the outer skin of the particle will solidify and achieve the mechanical strength necessary to survive product collection either as overhead from jacket 10 or as fallout in bin 19.

A duct 13 leads from the central opening 12 located in the upper portion of the jacket 10 vertically overhead and makes a long radius turn into a horizontal plane into the opening 14, entering tangentially to the interior of cyclone separator 15. Care should be taken in the duct design to avoid any sharp bends or other obstructions which would cause added turbulence of the gases flowing in duct 13 since many of the newly formed hollow spheres might be ruptured due to the resulting mechanical abrasion.

The cyclone separator 15 may be selected from any of the conventional types of such equipment available in the industry to effect the separation of fine particles from gases. In this embodiment the separator 15 is of circular cross section consisting of an upper section of cylindrical shape and a lower portion of inverted frustoconical shape. Another opening 26 in the separator 15 connects to gas outlet duct 25 which communicates tangentially with the interior of separator 15. Duct 25 leads to the inlet 27 of blower 28 powered by an electric motor not illustrated in the drawing. The blower 28 is so mounted as to discharge the gases at a desired rate from the blower outlet 29 into duct 30 which vents these gases from the building to the outside atmosphere. All the ducts (13, 25, 30) conveying the hot furnace gases can be constructed of galvanized sheet metal and preferably lagged with insulation. At the bottom of the lower portion of the separator 15 is a central opening 31 connected by conduit 32 which passes vertically downward to a product recovery bin 33 which is air tight due to the gas-tight door 35 and in which is situated product receiver 34. A gas-tight valve 36 is disposed within conduit 32 which can close off conduit 32 when the filled product receiver 34 must be removed.

In the practice of this invention, other conventional systems for separating fine particles from gases can be successfully substituted for the cyclone separator 15, and such systems are intended to be included as part of the invention. One such system, bag filter B, is shown in Figure 7. The operation of such a system is well known to those skilled in the art, and referring to Figure 7 it may be seen that the particle-laden gases enter the bag filter by duct 13'. The gases are drawn through the bags, leaving the particles as a coating on the outside surface of the bags. The frames supporting the bags are shaken periodically by a mechanical means whereby the particles are dislodged from the bag surface and fall in the hopper to opening 31'. The product collection from this point follows the same procedure as for the cyclone separator system in that opening 31' is connected by conduit 32' to the product recovery bin 33' which contains product receiver 34'. The gases leave the bag filter B by duct 25', and they are exhausted by the same means employed with the cyclone separator 15 in that duct 25' is connected to a blower not shown in Figure 7 which discharges the gases from the building.

It is also possible to use a cyclone separator system and a bag filter system in combination as an effective means for separating the product particles from the gases.

The feeding mechanism T capable of conveying the feed mixture to the furnace unit F comprises a feed hopper 2 which is a housing of circular cross section having an upper portion of cylindrical shape and a lower portion 3 of inverted frusto-conical shape. This leads to a conduit 4 which leads to a screw conveyor 5 which is powered by an electric motor not illustrated in the drawing. The screw conveyor 5 runs horizontally and supplies feed to a surge box 6. A conduit 7 enters the bottom of the surge box 6 and a conduit 8 leaves the surge box and passes through the jacket 10 and enters centrally into the bottom of furnace F. The suction created by the blower 28 causes air to flow into the conduit 7 which picks up feed material and transports it upwardly through the conduit 8 into the furnace to be described.

Figure 2:
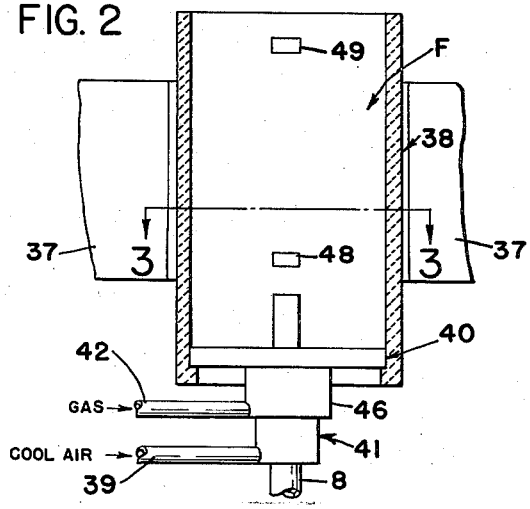
Figure 2 is an elevation, partly in section, showing certain furnace details.
Figure 3:
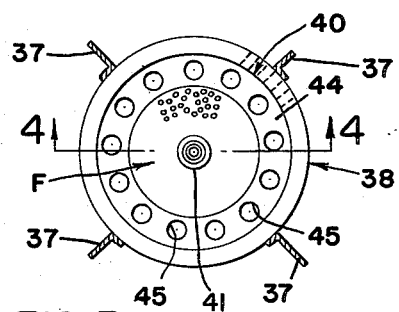
Figure 3 is a horizontal section on line 3—3 in Figure 2 viewed in the direction of the arrows.
Figure 4:
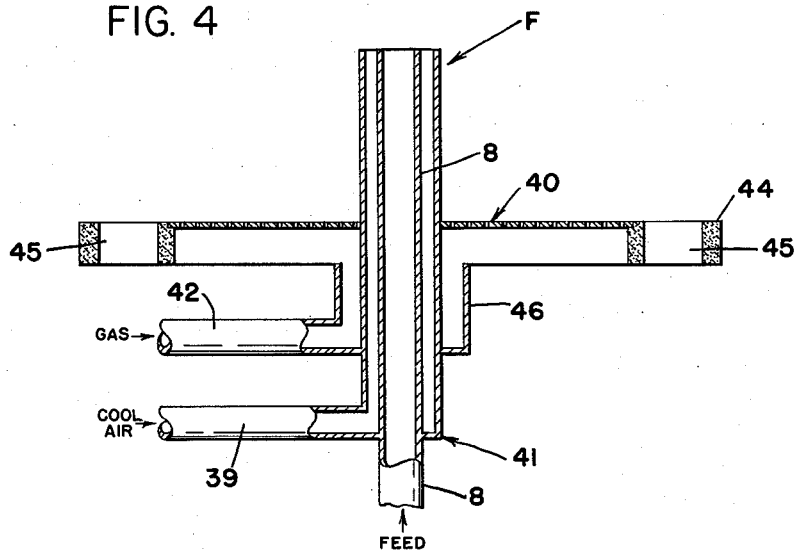
Figure 4 is a vertical section on line 4—4 in Figure 3.

Figures 2–4 show in greater detail the components of furnace unit F and the manner in which they coact. The relative dimensions for these elements depend upon what range of operating conditions are desired for the apparatus. The operating conditions to be considered most determining on the design of these components are gas rate or temperature, the feed rate, and air lift. The housing 38 is generally cylindrical in shape and is formed from ceramic or other fireproof material. Its height is a function primarily of the temperature range and air lift anticipated for operation. As the air lift is increased, the height of furnace housing 38 must be increased to provide the same residence time for the particles. It can be readily seen that with the air lift being considered constant, that as temperatures are increased the housing 38 may be shortened so the feed particles will remain in the hot zone of the flame a shorter time and still receive the same quantity of heat. The diameter of housing 38 must be of a practical dimension to accommodate the ranges of feed rate desired for operation, the supply of air and gas to develop the temperatures desired, and the supply of updraft air to cool the wall of the housing 38.

Referring more particularly to Figure 2, the housing 38 for this embodiment is a cylinder opened at its top. Slight departures from a truly cylindrical shape may be made, such as elliptical or conical, and reference herein to cylindrical in shape is intended to embrace such slight departures. Spaced equally around housing 38 are the four brackets 37 which support housing 36 centrally within jacket 10 at a position just above the lower end portion 16. Temperature measuring devices are disposed at 48 near the bottom of housing 38 and at 49 near the top of housing 38 with recording mechanism located in some convenient locus away from the apparatus to enable operators to observe temperatures at these two points.

The conduit 8, which transports feed material in a stream of air to the furnace F, enters centrally at the bottom of housing 38. Conduit 39 enters jacket 10 through an opening (Figure 1) and forms a larger conduit 41 surrounding conduit 8. The conduit 39 is open to the atmosphere and air can enter it and the conduit 41 upon operation of the blower 28. A burner 40 surrounds the conduit 41 and is supplied with gas through a conduit 42 which enters jacket 10 through an opening therein (Figure 1) and forms a larger conduit 46 surrounding conduit 41. Conduits 8 and 41 are extended to the same level within furnace F and of such a height so that the finely divided feed material will not melt appreciably before entering the furnace housing 38. The height for both conduits can be as low as the level of burner 40 if the feed rate is sufficiently high so that particles will not fuse to the burner.

Referring to Figures 3 and 4, burner 40 consists of a circular burner plate immediately surrounding conduit 41 with a plurality of jets on its upper face for the burning of gas which is transported to the burner by conduits 42 and 46. Immediately surrounding the burner 40 is a circular plate 44, the outer periphery of which forms a seal with the inside of the housing 38. Plate 44 has a plurality of holes 45 to supply updraft along the inside of the furnace housing 38 to prevent deposition of product in the melted state on the inner surface of furnace housing 38.

The following discussion illustrates how our apparatus may be used. Blower 28 is started and gas line 42 is opened, permitting burner 40 to be fired. Conduits 7 and 41 are opened to provide combustion supporting air. Adequate time is allowed to build up a desired temperature in the furnace housing 38, and gas rate is supplied to burner 40 to maintain this temperature level. Gas rate is balanced with air from conduits 7 and 41 to maintain a desired temperature gradient between point 48 and point 49 within the housing 38, at which points temperature is being continuously recorded.

Finely divided feed mixture of a particle size range desired is supplied to the feed hopper 2, and the variable screw conveyor 5 is started and set at a speed to deliver a desired rate of the feed mixture to surge box 6. The air stream in conduits 7 and 8 lifts the feed mixture into the furnace housing 38 directed into hot area of the burning gases. The individual particles rise to a point within the furnace housing where the upward gas velocity carrying the particle is balanced by the force of gravity exerted on the particle. The small particles settle at greater heights than the larger particles, and air lift conditions are set whereby the large particles are present in the hotter zone of the furnace and, due to the principles of this updraft method, receive the extra requirements of heat necessary to initiate fusing in the particle and begin formation of the desired hollow sphere.

As the particles convert to spheres and are filled with gas, the relative diameter of the particles increase appreciably; and due to this increase in size and due to the spherical shape of the particles, the buoyant effect of upward gases increases and overcomes the former balance between the upward gas and the force of gravity and carries the particles to a greater height in the furnace and subsequently out of the furnace into the quenching zone 9 of progressively diminishing temperature, thereby removing the particles before they become overheated in the hot regions of the furnace. The residence time of the particles in the furnace is generally from 0.5 to 10 seconds. The particles in the quenching zone cool below the fusing temperature, thereby solidifying the outer skin of the particles and providing the added strength required by the particles to survive the mechanical abrasion to which they will be subjected during subsequent collection. The particles once in the quenching zone will be carried to higher levels and eventually suspended in the upward gas flow leaving jacket 10 overhead and transported to cyclone separator 15, or will stray from the path of upward gases in the quenching zone and be overcome by the forces of gravity so as to settle to the lower portion 16 of the jacket 10 and fall to product receiver 20. The particles that go overhead by duct 13 to separator 15 will move downward to product receiver 34, while the gases will be exhausted to blower 28 and finally vented by duct 30 to the outside atmosphere.

The rate of the blower 28, the feed screw 5, and the gas to the burner 40 can be adjusted, considering the nature of the feed material and its size so as to give the desired product.

Figure 5:
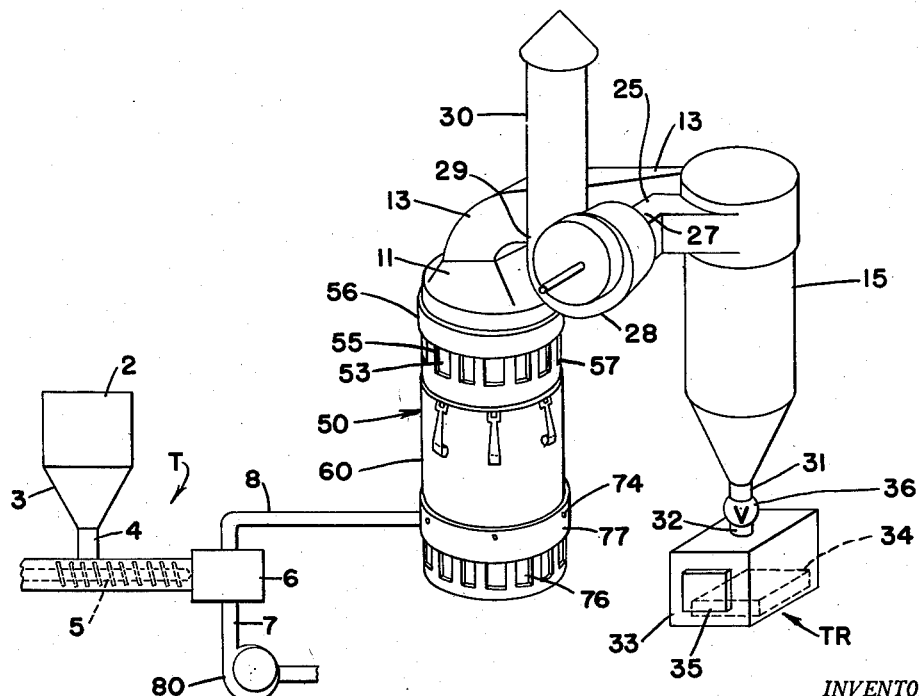
Figure 5 is a perspective view of a modified apparatus which is fired directly through the furnace wall.

Figure 5 describes a modified furnace design also operable within the principle of the updraft method for producing hollow particles, which avoids the requirement for a cooling jacket and permits increased flexibility in design of feed inlet to the furnace area. Furthermore, this design provides for all the product removal overhead. The modified furnace design comprises an upright cylindrical housing of uniform diameter consisting of three areas of nearly equal height disposed in vertical sequence as a lower support area, a furnace area, and a quenching area, respectively.

In Figures 5 and 6 the central furnace area 50 is formed by the furnace section 54 which is constructed of insulating firebrick that is capable of sustaining the high temperatures of operation, i.e., up to approximately 2500° F. Circle brick is chosen for this section so a cylindrical shape can be constructed. The brick is surrounded by a housing 60. Furnace section 54 rests on a circular steel plate 70 which has the same inside opening and outside diameter as furnace section 54. The steel plate 70 is supported by four steel legs 71 of equal height extending downward to the floor area. The actual height and diameter of furnace section 54 will be dependent again upon the range of operating conditions desired for the apparatus.

Referring now to Figure 8, furnace area 50 is fired directly with six torch burners 51 which enter furnace section 54 on the same plane at a level near the base of the furnace area 50 through openings 52 which are spaced equally around furnace section 54. If burners 51 point into the furnace area 50 radially, there may be temperature irregularities in the furnace area 50. By adjusting this direction to an angle slightly off the radial position, a spiraling action of the gases results, which tends to equalize the temperature throughout the furnace area. An angle between 5 and 10° from the perpendicular will effectively stabilize the temperature.

Referring again to Figure 6, immediately above the furnace area 50 a quenching zone 53 is provided to cool the gases and particles before they pass overhead for separation and product collection. Quenching zone 53 is formed by the housing 57 and is a sheet metal cylinder having nearly the same height as furnace housing 60 and having an outside diameter equal to that of furnace housing 60. A flange is provided on the outside periphery of the upper edge of housing 57 to accommodate duct 11 leading to conduits 12 and 13. The product recovery is identical with that showing as the upper product recovery system in Figure 1 and shown generally in Figure 5. At a position near the lower end of housing 57 a series of air ports 55 are spaced equally around the annular wall of housing 57, and the combined area of these rectangular cross section ports will provide the admittance of sufficient outside air during operation to maintain a desired temperature within the quenching zone 53. Air is drawn in through ports 55 by means of the blower 28. The actual area of the ports 55 can be regulated by adjusting sleeve 56 which is disposed on housing 57 vertically above ports 55 and can be lowered to any desired uniform level around the ports within the limits of permitting them to be completely open or completely closed. The sleeve 56 can be held in position by the screws 58. The area below the furnace area 50, referred to as the lower support area 65, is surrounded by cylindrical housing 75 composed of sheet metal, similar to housing 57 enclosing the quenching zone 53. The outside diameter of this housing will be equal to the outside diameter of furnace housing 60, and housing 75 will run from immediately below the furnace housing 60 downward to the floor area and will be fixed in place by fastening said housing at several points to the steel legs 71. Near the bottom of housing 75 and spaced equally around the annular wall is a series of air ports 76 of rectangular cross section which permit outside air to enter to prevent formation of fused material on the walls of furnace area 50 and also to provide combustion supporting gas. The amount of air entering ports 76 during operation is controlled by sleeve 77 which is positioned vertically above ports 76 and which fits the outside contour of housing 75. Sleeve 77 can be easily lowered to any desired level, and held by screws 74, thereby restricting the opening of ports 76 as may be required.

Centrally located within the lower support area 65 at a point just below the furnace area 50 is spray nozzle 64 attached to the end of conduit 8 which is capable of effecting a full cone spray of feed solids directly into the furnace area 50. The feed is delivered to the spray nozzle 64 by the feed system shown generally in Figure 5 wherein the feed is suspended in air and transported within conduit 8. The structure for adding the feed particles to the air is similar to that shown in Figure 1 except that instead of depending upon the blower 28 to draw air through the conduit 7, surge box 6, and conduit 8, a blower 80 is employed to force air and suspended feed through the spray nozzle 64 into the furnace area 50.

The method and apparatus of our invention may be used to form hollow spheres from any suitable feed material. The preferred feed materials are those described in co-pending application Serial No. 691,726, filed of even date herewith, the description of the feed materials in that application being incorporated herein by reference to the extent necessary. These materials are composed of a plurality of ingredients which fuse to form a glass and a compound which liberates a gas at the fusion temperature.

We are aware that apparatus other than that described may be used to practice the method of this invention and is the equivalent of that shown.

We claim:
1. A method of producing hollow spheres from finely divided solid particles of material forming a glass upon fusion thereof in admixture with a compound which liberates a gas at the temperature of said fusion, which comprises passing a stream of hot gas upwardly through a vertical furnace zone at a temperature to fuse said solid particles and liberate a gas from the said compound, introducing said solid particles in the lower part of said zone so that they are propelled upwardly within said zone by said ascending hot gas stream, adjusting the velocity of said hot gas stream within said zone so that said solid particles remain in the hot gas stream for a period of time necessary to permit fusion and expansion into unitary, hollow spheres, whereby after expansion they are carried upwardly and out of said furnace zone by the said ascending gas stream through a cooling zone, and recovering the spheres so produced.

2. A method of producing hollow spheres from varying sized, finely divided, solid particles of material forming a glass upon fusion thereof in admixture with a compound which liberates a gas at the temperature of said fusion, which comprises passing a stream of hot gas upwardly through a vertical furnace zone at a temperature to fuse said particles and liberate a gas from said compound, introducing said solid particles in the lower part of said zone so that they are propelled upwardly within said zone by said ascending hot gas stream, adjusting the velocity of said hot gas stream within said zone so that the larger of said solid particles remain in the hot gas stream for a longer period of time and the smaller of said solid particles remain in the hot gas stream for a shorter period of time to permit all said particles to fuse and expand into unitary, hollow spheres, whereby after expansion they are carried upwardly and out of said furnace zone by the said ascending gas stream through a cooling area, and recovering the spheres so produced.

3. A method of producing hollow spheres from varying sized, finely divided, solid particles of a plurality of materials forming a glass upon fusion thereof in admixture with a compound which liberates a gas at the temperature of said fusion, which comprises passing a stream of hot gas upwardly through a vertical furnace zone at a temperature to fuse said particles and liberate a gas from said said compound, suspending said solid particles in an air current and introducing said current in the lower part of said zone so that the particles in said curent are propelled upwardly within said zone by said ascending hot gas stream, adjusting the velocity of said hot gas stream within said zone so that the larger of said solid particles remain in the hot gas stream for a longer period of time and the smaller solid particles remain in the hot gas stream for a shorter period of time to permit all said particles to fuse and expand into unitary, hollow spheres, whereby after expansion they are carried upwardly and out of said furnace zone by the said ascending gas stream through an area in which said stream and said particles are cooled, and recovering from said cooled stream the spheres so produced.

References Cited in the file of this patent

UNITED STATES PATENTS

| | | |
|---|---|---|
| 2,187,538 | Butler | Jan. 16, 1940 |
| 2,421,902 | Heuschotz | June 10, 1947 |
| 2,430,601 | Cleary | Nov. 11, 1947 |
| 2,431,884 | Neuschotz | Dec. 2, 1947 |
| 2,543,987 | Ramsay | Mar. 6, 1951 |
| 2,572,484 | Howle et al. | Oct. 23, 1951 |
| 2,619,776 | Potters | Dec. 2, 1952 |
| 2,676,892 | McLaughlin | Apr. 27, 1954 |
| 2,797,201 | Veatch et al. | June 25, 1957 |